Feb. 24, 1942.   R. N. JANEWAY   2,274,484
RAILWAY VEHICLE
Filed Oct. 1, 1938   4 Sheets-Sheet 1

INVENTOR
ROBERT N. JANEWAY
BY
Harness, Lind, Pates & Harris
ATTORNEYS.

Feb. 24, 1942.  R. N. JANEWAY  2,274,484
RAILWAY VEHICLE
Filed Oct. 1, 1938  4 Sheets-Sheet 2
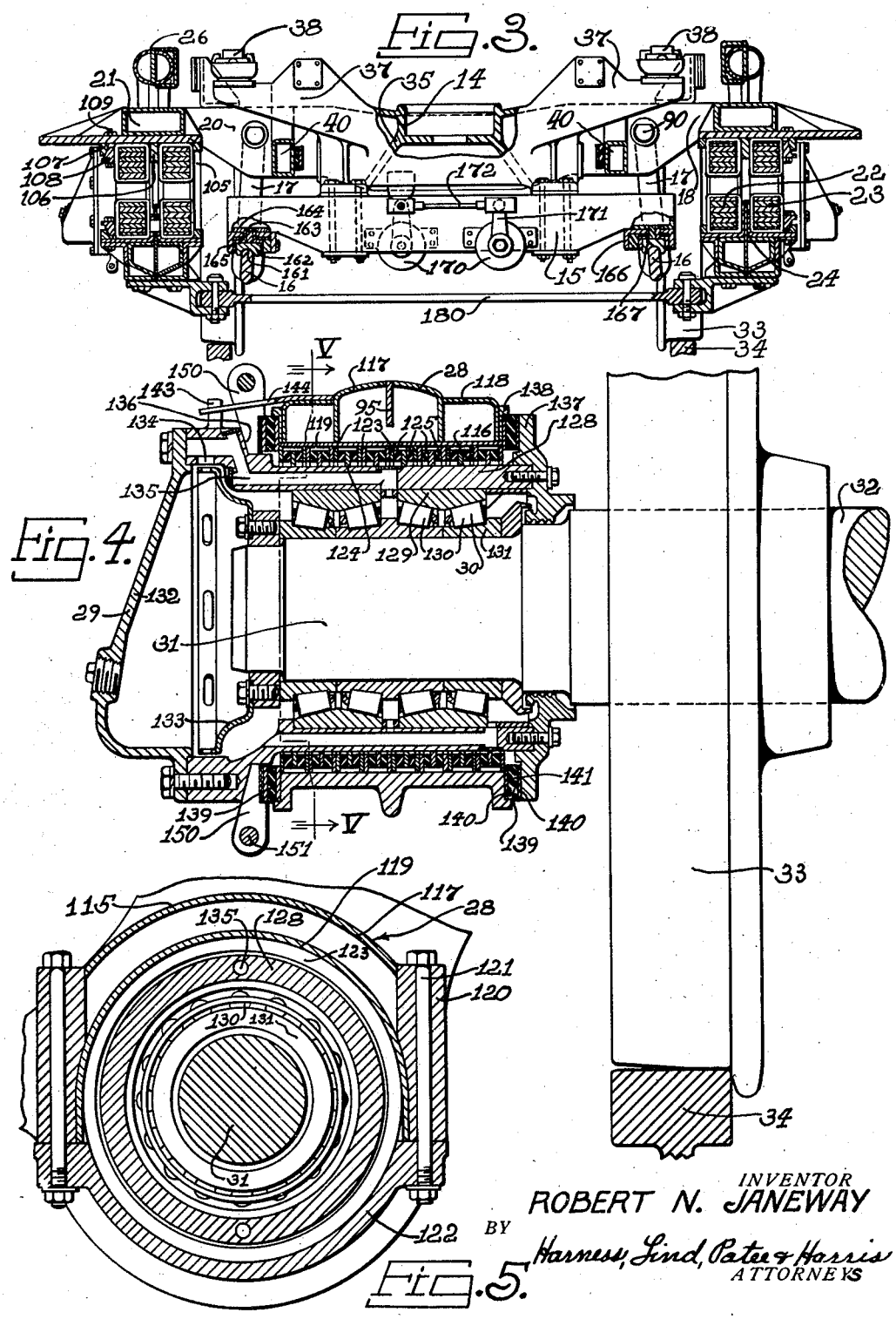
INVENTOR
ROBERT N. JANEWAY

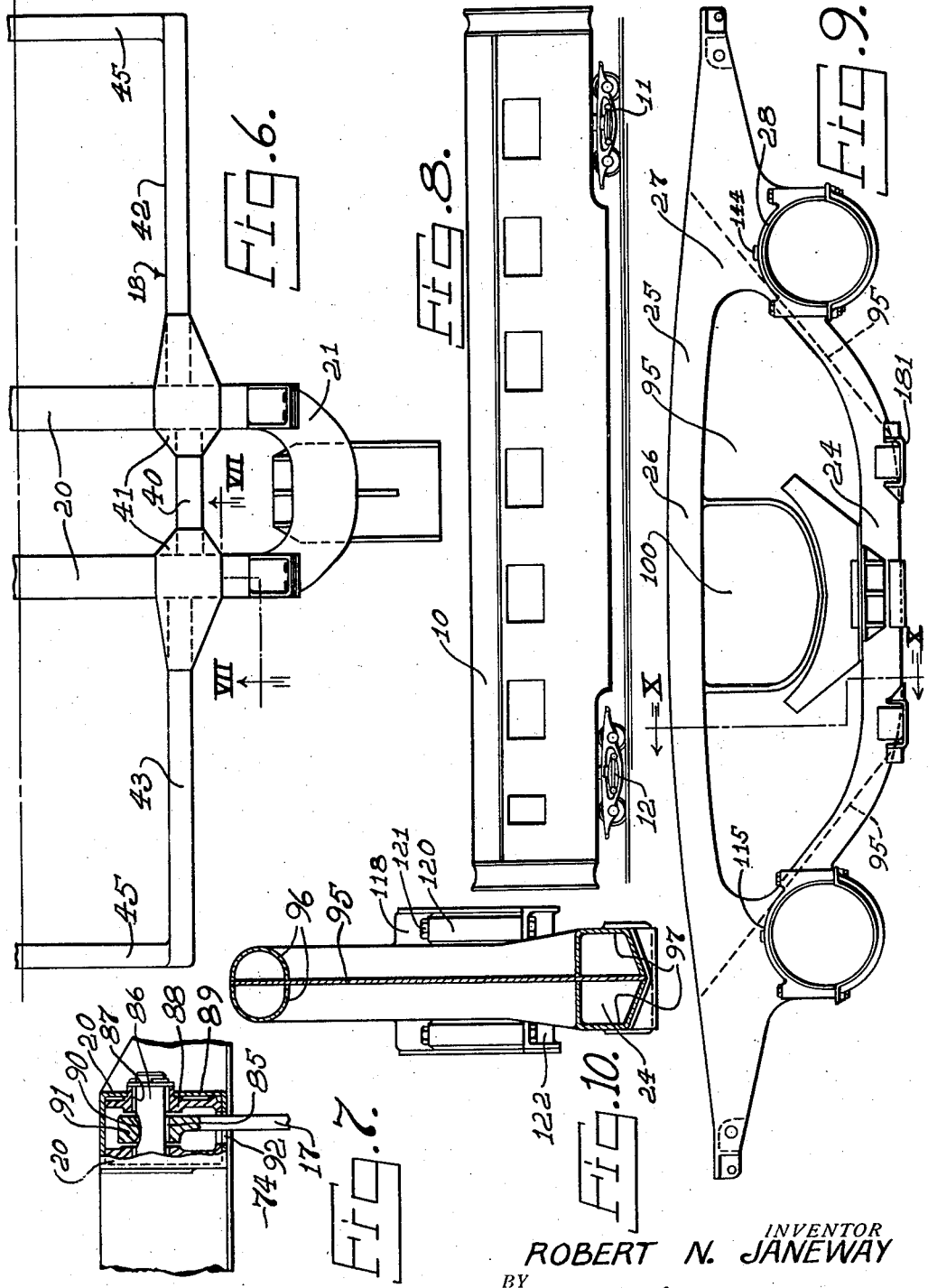

Feb. 24, 1942.  R. N. JANEWAY  2,274,484
RAILWAY VEHICLE
Filed Oct. 1, 1938   4 Sheets-Sheet 4

INVENTOR
ROBERT N. JANEWAY
BY
Harness, Lind, Pater & Harris
ATTORNEYS.

Patented Feb. 24, 1942

2,274,484

UNITED STATES PATENT OFFICE 2,274,484

RAILWAY VEHICLE

Robert N. Janeway, Detroit, Mich., assignor, by mesne assignments, to Railroad Rolling Stock Patents Corporation, a corporation of Delaware Application October 1, 1938, Serial No. 232,756

4 Claims. (Cl. 105—190)

My invention relates to railway vehicles and it has particular relation to the construction of railway vehicle trucks.

One object of my invention consists in providing a novel type of railway truck construction which provides improved riding qualities in the car body supported thereby.

Another object is to provide a truck construction in which full advantage is taken of the use of a truck frame suspended on swing links and, at the same time, the secondary reaction, resulting from having the mass of the truck frame suspended intermediate the equalizer springs and the bolster springs, is eliminated.

A further object of my invention consists in providing a novel type of truck construction in which but a single set of springs is employed and in which the unsprung weight is reduced to a minimum.

An additional object of my invention consists in providing a truck construction in which side frames carry the wheel load and all vertical and lateral forces transmitted therefrom to the truck frame must be transmitted through the main supporting springs.

For a better understanding of my invention reference may now be had to the accompanying drawings, in which:

Fig. 3 is a transverse vertical cross-section of the structure shown in Figs. 1 and 2, the view being taken along the line III—III of Fig. 1.

Fig. 4 is a view, partially in side elevation and partially in section, the sectional portion representing a vertical cross-section through one of the wheel axle bearings.

Fig. 5 is a vertical cross-sectional view of the wheel axle bearing illustrated in Fig. 4, the section being taken along line V—V thereof.

Fig. 6 is a plan view of the central portion of the car truck frame.

Fig. 7 is a cross-sectional view of the structure illustrated in Fig. 6, the view being taken along the line VII—VII thereof.

Fig. 8 is a side elevational view of an entire railway car embodying my invention.

Fig. 9 is a side elevational view of a side frame.

Fig. 10 is a cross-sectional view thereof, the view being taken along line X—X thereof.

Figures 1, 2:
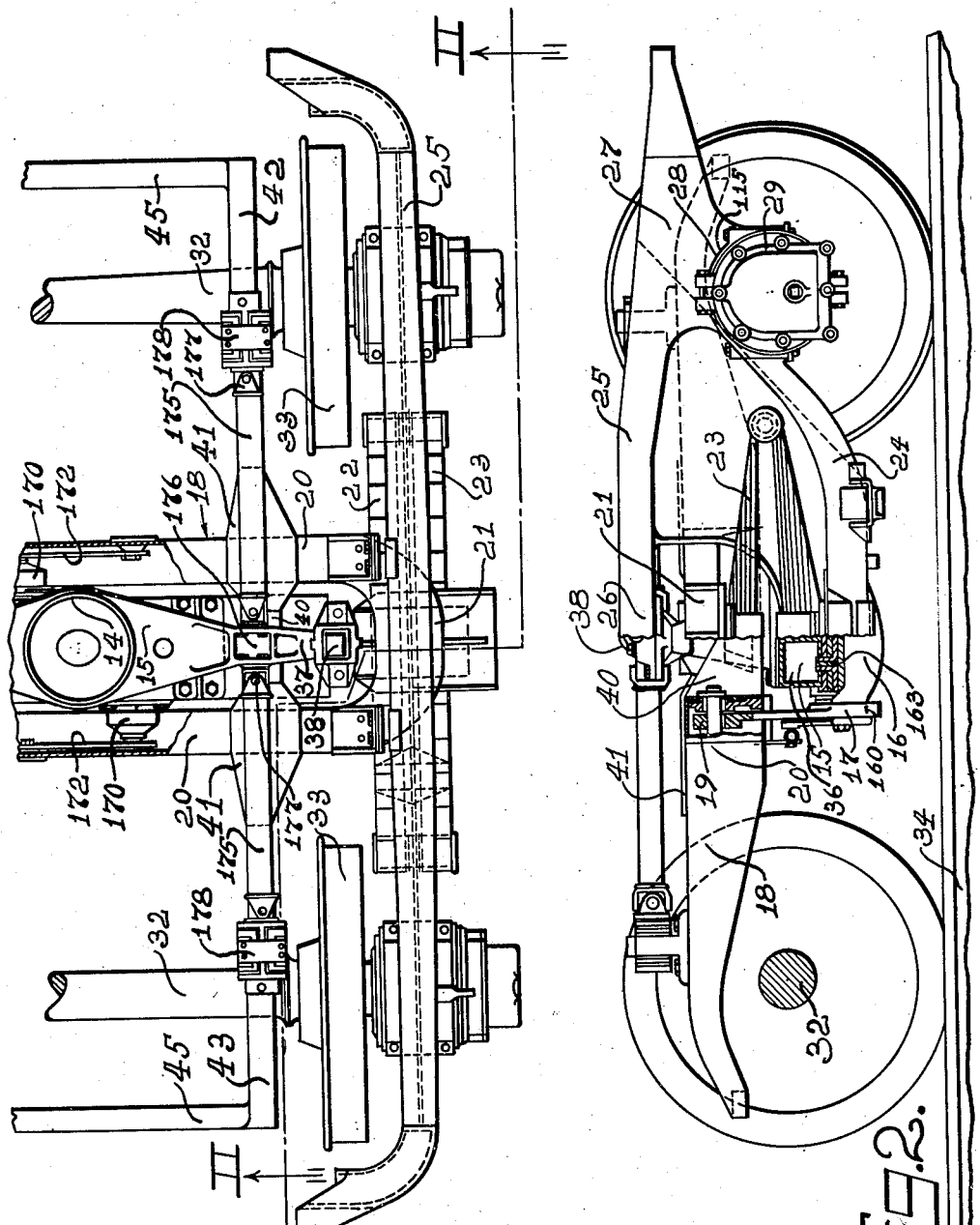
Fig. 1 is a plan view of a portion of a railway truck embodying certain of the features of my invention.
Fig. 2 is a view of the structure shown in Fig. 1, the view being partially in side elevation and partially in cross-section, the second being taken along the line II—II of Fig. 1.

In the structure illustrated a car body 10 is supported adjacent each end upon a front truck 11 and a rear truck 12, the car body having car body bolsters which are provided with center bearing members which fit within and rest upon a center bearing member 14 of each truck. The center bearing 14 rests upon a truck bolster 15 which extends laterally centrally of the truck. At each end of the bolster 15 is provided a longitudinally extending member 16 on which the bolster rests and which in turn is supported at each end upon a swing link 17. The swing links 17 are pivotally mounted upon a truck frame 18 as illustrated at 19. The truck frame 18 comprises two spaced relatively heavy transversely extending members 20, generally known as transoms, the ends of which are connected together by means of an arcuate rigid end portion 21. The swing links 17 are pivotally connected to the transom members 20 adjacent the ends thereof and the transom members 20, through the agency of the arcuate end member 21, which projects laterally beyond the ends of the transom members proper, rest upon a pair of elliptical leaf springs 22 and 23, as best shown in Fig. 3. The lower portion of the springs 22 and 23 rest upon a lower portion 24 of a side frame member 25. The side frame member 25 is provided with an upper portion 26, which is spaced from the lower portion 24, throughout the major portion of its length, but the two portions are integral, being united at the ends of the side members, as shown at 27, to provide a semi-circular supporting member 28, as best shown in Fig. 9. The semi-circular members 28 rest upon a bearing housing 29 in a manner to be hereinafter described and, through the agency of axle bearings 30, transmit the load carried thereby to an end portion 31 of a wheel axle 32 on which is mounted a wheel 33 adapted to roll upon rails 34 of the usual railroad rail type.

From the foregoing description it will be apparent that all the weight of the car body and all the weight of the truck with the exception of the side frame members, the wheels and the axles, rest upon the springs 22 and 23 and there are no springs disposed in the weight supporting chain between the springs 22 and 23 and the car body, thus eliminating the creation of a relatively heavy mass of material mounted between two sets of springs, as is customary on most passenger car trucks, and which is conducive to the transmission of secondary vibrations to the car body from this independently sprung mass. It will also be apparent that substantially all of the weight of the truck constitutes a portion of the sprung mass, thus minimizing the unsprung portion thereof.

As illustrated, the truck bolster 15 is disposed at a horizontal level lower than in the average present day construction and the center bearing 14 is mounted thereon by means of a supporting structure 35 by which it is raised considerably above the level of the truck bolster. The bolster 15 is composed of a fabricated sheet metal construction as illustrated at 36 in Fig. 2, so as to provide lightness without sacrificing strength. Adjacent each end of the member 35 is an integral extension 37, on the outer end of which are rotatably supported the usual rollers 38 which engage the car body bolster to prevent angular tilt of the car body with respect to the bolster.

As previously stated, the transom members 20 are connected together at their end portions by means of the outwardly extending arcuate interconnecting portion 21. In addition, as best shown in Fig. 6, they are connected together intermediate their ends by means of a relatively light frame member 40 secured thereto by means of reinforcing plates 41, the reinforcing plates extending toward the ends of the truck and these portions of the plates assist in securing to the transom members 20 additional relatively light frame members 42 and 43, extending forwardly and rearwardly, respectively, from the transom members. The outer ends of each pair of forwardly and rearwardly extending members 42 and 43 are secured together by means of a relatively light transversely extending frame member 45. It will be noted that the portions 42 and 43 of the frame member do not serve to transmit any of the weight of the car body or truck frame to the wheels but instead serve only as a support for the wheel brake mechanism and as a thrust link anchorage, as will be described in detail later.

The swing link mechanisms are all alike, each comprising a swing link 17 pivotally connected to a transom member 20 by means of a pivotal connection 19 and connected to the bolster supporting arms 16 by what might be known as a rounded knife edge joint permitting relative movements between the link 17 and the arm 16 in both a transverse and longitudinal direction. The pivotal connection 19 comprises the upper end of the swing link 17 provided with an opening 85 of greater diameter than a journal pin 86 which fits thereinto, as best shown in Fig. 7. The journal pin 86 is rotatably mounted in suitable bearing members 87, supported in bearing supports 88, secured within downwardly extending sides 89 of the transom members 20, which are of box section, so that the pin 86 is free to rotate therein.

The pin 86 is provided with a transversely extending arcuate notch 90 within which is adapted to rest a member 91 having a lower edge of arcuate cross-section, constituting the upper portion of the link 17. The notch 90 extends transversely of the truck frame as does the arcuate portion 91 so that any swinging movement of the link 17 transversely of the truck frame will cause rotation of the pin 86 in the bearings 87, and any swinging movement of the link 17 longitudinally of the truck frame will cause rotation of the arcuate surface 91 in the arcuate groove 90 in the pin 86. The transom members 20 are cut away a sufficient distance on each side of the link 17 to permit limited swinging movement in a direction longitudinally of the truck frame, as illustrated at 92. The contacting surfaces 91 and 90, and the bearing members 87 may be lubricated in any desired manner so as to permit freedom of movement therebetween. The arc of the lower surface of the member 91 is of a smaller radius than the arc of the notch 90 so that the member 91 will roll in the notch 90 practically free of friction.

The side frame members 25, comprising the integral upper portion 26 and lower portion 24 each consists of two substantially similarly shaped pressed metal members welded together throughout their lengths. As best shown in Fig. 10, the upper portion 26 of each of the pressed metal members is substantially semi-circular in cross-section, as illustrated at 96 and the lower portion 24 is of U-shape section as indicated at 97. A centrally disposed vertically extending metallic web member 95 spans the portion 24 and 26 and is welded thereto, the web member extending throughout the major portion of the length of the side frame member, as best shown in Fig. 9. The web member 95 is provided with a centrally disposed opening 100 through which the curved end portion 21 of the transom members 20 extends so as to rest upon the leaf springs 22 and 23 which are disposed, one on each side of the web member 95 of the side frame 26, as best shown in Fig. 3. The opening 100 is sufficiently large to permit vertical movement of the transom connection 21 between the upper and lower portions 25 and 24 of the side frame members as the springs 22 and 23 are compressed or expanded by reason of irregularities in the rail surfaces.

Figures 11, 12:
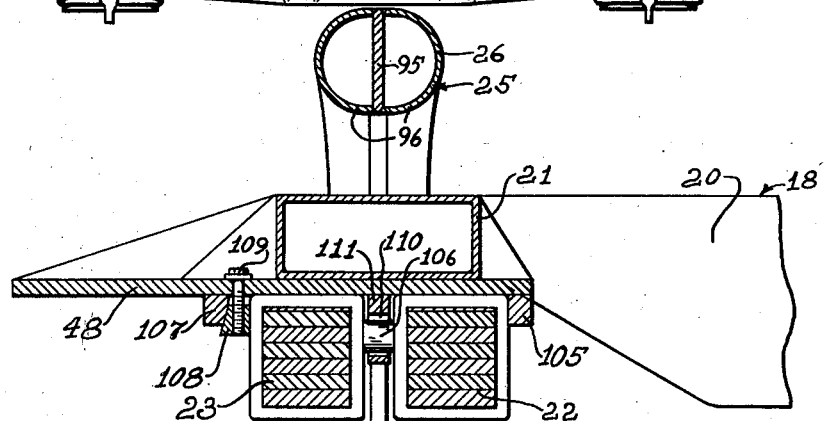
Fig. 11 is a plan view of the two side frames with their interconnecting means.
Fig. 12 is an enlarged detail cross-sectional view illustrating the means for securing the springs to the side frames and truck frame.

As the springs 22 and 23 constitute the only support of the truck frame of the car body it is apparent that the lower portions of the springs should be rigidly clamped to the side frame and the upper portions should be rigidly clamped to the extension 21 of the transom members 20. As best shown in Fig. 12, the central portions of the springs 22 and 23 are clamped to the transom end 21 by means of the brake rigging supporting plate 48 which is welded or otherwise suitably secured to the transom end 21. To the inner edge of the underside of the plate 48 is rigidly secured a stay block or abutment 105 against which spring 22 fits and a spacing block 106 is disposed between the springs 22 and 23. A second stay block or abutment 107 is secured to the plate 48 on the outer side of spring 23 in spaced relationship thereto. The block 107 is provided, on the side adjacent the spring 23, with an inclined face which is engaged by a corresponding inclined face of a wedge block 108 disposed in engagement with the spring 23. Bolts 109 attached to the wedge block 108 and extending through the plate 48 enable one to pull the block towards the plate 48, whereupon the inclined faces of the blocks 107 and 108 move the spring 23 into clamping engagement with the spacing block 106, the spring 22 and the stay block 105, with any desired pressure. The spacing block 106 is disposed within and extends through an opening 110 in a reinforcing member 111 welded or otherwise secured to the bottom of the plate 48.

The lower portions of the springs 22 and 23 are secured to the side frame 25 in a similar manner. In this instance a spacing block 112 extends through an opening 113 in the web 95 of the side frame 25 and through corresponding aligned openings in the spring seat reinforcement which extends beneath the springs 22 and 23 and on each side of the web 95. Where desired a compression tube 114 is arranged to extend through the lower portion of the web 95 and through the members 97, to which it is welded for reinforcing purposes.

By reason of this construction all inertia forces are transmitted through the springs 22 and 23, which thus serve as a cushioning device with respect to longitudinal forces tending to accelerate or decelerate the train, and to lateral forces caused by irregularities in the rail surfaces as well as the normal vertical forces, so that these springs act somewhat on the principle of a Hotchkiss drive. In order to permit the springs to serve as a cushioning member with respect to forces transmitted longitudinally of the truck frame it is necessary that some relative movement of the side frame and truck frame with respect to the truck bolster be permitted, and it is for this reason that the swing links 17 are provided with pivotal connections at both ends permitting swinging movement thereof in directions longitudinal of the truck frame as previously described.

The upper and lower members 26 and 24 embody an arcuate portion 115 which serves to partially enclose an annular flexible member 116. The semi-cylindrical members 96 are straightened out at their ends to form members 117 of L-shaped cross-section, as best illustrated in Fig. 4, and beside each of them is secured a semi-circular pressed metal member 118 of L-shaped cross-section. The portions 117 and 118 are welded to a semi-circular plate 119, and are provided with integral lugs 120, adapted to receive bolts 121, by means of which a semi-circular retaining member 122 is adapted to be secured thereto, the members 122 constituting the lower half of a circular enclosure and the members 119 constituting the upper half thereof.

Within the annulus formed by the members 119 and 122 is disposed the flexible member 116 which comprises a plurality of end plates 123 and center plates 124 having annular rubber members 125 vulcanized or otherwise suitably bonded thereto. Each of the end plates 123 has an outer diameter which is greater than the outer diameter of the central plate 124, and the center plate 124 has an inner diameter which is smaller than the inner diameter of the plates 123. The rubber members 125 are vulcanized so as to hold the two end plates 123 and the center plates 124 in a single integral unit of which the metal rings are kept out of contact with each other. The inner peripheries of all of the centerplates 124 are uniform in diameter and are adapted to fit over and retain an annular bearing housing 128 and the end rings 123 are of uniform external diameter and closely engage the semi-circular members 119 and 122 so as to support the bearing housing on the members 119 and 122 but out of metallic contact therewith.

Within the housing 128 are disposed annular roller races 129 which are adapted to be engaged by a plurality of tapered rollers 130 which likewise engage inner bearing races 131 which are secured to and rotate with the wheel axle 31. The housing 128 is closed, at its outer end, by means of a housing end plate 132 bolted thereto, and is adapted to contain oil or other liquid lubricant so that the rollers on the lower side of the bearing are constantly immersed in oil. The inner bearing race 131 is provided with an oil throwing sleeve 133 which picks up oil at the lowermost point of its travel and throws it outwardly into an opening 134 disposed in the upper part of the stationary housing 128. An oil duct 135 carries the oil by gravity from the opening 134 to the upper part of the bearing so as to constantly bathe those rollers which are, at the moment, in the uppermost position with oil.

The bearing housing 128 is provided, at one end, with an annular flange 136, as shown in Fig. 4, and at the other end with an annular bolted on flange 137, both flanges being greater in diameter than the inner portions of the support members 119 and 122. Annular plates 138 are secured to the outer sides of the L-section members 118 and in axial alignment with the flanges 136 and 137. Disposed intermediate the plates 138 and the flanges 136 and 137 are two annular flexible members 139 each comprising spaced metallic side plates 140 and a central member 141, composed of rubber, which is bonded or otherwise secured to the plates 140. The rubber members 141 prevent any metallic contact between the semi-annular members 118, 119 and 122 on the one hand and the flanges 136 and 137 of the bearing housing on the other hand and at the same time permit a certain degree of flexibility therebetween longitudinally of the wheel axle 32. Disposed intermediate the flange 136 and the annular flexible member 139 is disposed a ring 150, made in two semi-circular parts and bolted together to form an annulus. This ring, when pulled into place by its bolts, serves to force the flexible member 139 into close fitting engagement with the rings 138 and the flange 137 and cause the flexible members to carry a portion of the vertical load in shear. When the ring 150 is removed, by loosening its bolts, the various parts are no longer held rigidly in place and may be disassembled or adjusted.

The rubber members 125 prevent metallic contact between the axle housing 128 and the semi-circular supporting structures 119 and 122 and at the same time permit a certain amount of resilient movement therebetween in a vertical direction and in a direction longitudinally of the truck frame. These rubber members 125 and 141 therefore act as noise and shock eliminators between the wheels and the side frames and, to the degree that they permit flexibility, serve as load equalizers between the various bearing members. In addition, they provide a cushion between the side members and the wheel axles, thus adding the side frame members to the sprung load leaving only the wheels, axles, wheel bearings and bearing housings to constitute the unsprung load.

In order to eliminate the possibility of incorrectly assembling the bearing housing within the semi-circular members 119 and 122 I have provided the flange 136 with two small spaced lugs 143 at its uppermost point and have welded or otherwise suitably secured a metallic finger 144 to the upper side of the L-shaped member 118, as best shown in Fig. 4, which is adapted to fit between the fingers 143, it being essential that the opening 134 in the housing 128 be at all times assembled in the uppermost position possible so as to provide the proper feeding of oil to the upper bearings.

The ring member 150, the inner surface of which constitutes the flange 136, is composed of two semi-annular members connected together by means of bolts 151, and serves to hold the bearing housings and rubber insulating members properly positioned within the opening in the side frame. When it is desired to remove or replace the bearing member the bolts 151 are removed, thus permitting the readily dis-assembly of the entire structure.

In order to further eliminate the transmission of noises and vibration from the truck to the car body I have found it advisable to insulate the bolster 15 from the bolster supporting member 16. As best shown in Figs. 2 and 3, the bolster supporting member 16 extends longitudinally of the truck and each end extends freely through an opening in the bottom of one of the swing links 17. The bottom portion of the opening in the swing ling represents an arc drawn about an axis extending longitudinally of the truck and a vertical cross-section of the swing link through the opening would show a lower surface 160 of arcuate contour, representing an arc drawn about an axis extending transversely of the truck. The ends of the bolster supporting member are provided with notches of similar contour and cross-section, thus permitting universal movement of the bolster supporting member 16 on the swing links 17.

Resting on the bolster supporting member 16, which is provided with an upper edge 161 of arcuate cross-section is a metalic pad 162 having a longitudinally extending groove of arcuate cross-section in its bottom surface adapted to fit over and rest upon the arcuate surface 161 to permit a slight rolling action thereon. The metallic pad 162 is provided, on its upper surface with a plurality of integral small upwardly extending nipples 163 which extend into suitable openings 164 in the bottom of the bolster 15 to prevent any possibility of relative displacement thereof. Disposed intermediate the metalic pad 162 and the bolster 15 is a member 165 which covers the top and sides of the pad 162 and extends upwardly around the nipples 163 into the openings 164 in the bolster 15. The member 165 is composed of some suitable flexible insulating non-metallic material, preferably of a laminated rubber and fibrous material such as that now known as "Fabreeka," and serves to insulate the bolster and the bolster supporting pad. The resilient member 165 is preferably enclosed within a metal casing 166 in order to protect it and shims 167 may be inserted between the member 165 and the casing 166 in order to provide the correct coupler height if desired.

Also, I have found it desirable to employ shock absorbers to dampen any lateral movement between the bolster and the truck frame. As shown in Fig. 3, I employ two shock absorbers 170, disposed one on each side of the bolster 15, and bolted thereto, each provided with an arm 171 pivotally secured to a radius rod 172 which, in turn, is pivotally secured to the adjacent transom members 20.

In Fig. 1 are also shown two thrust links 175, secured at their adjacent ends to a bracket 176 mounted on top of the bolster member 15 by means of a universal joint 177. In like manner the opposite ends of the thrust links are secured to the truck frame by means of universal joints 177 which are secured, through a rubber draft member 178 which is secured to the truck frame, the links 175 serving to take longitudinal thrust between bolster and truck frame without introducing friction to restrain free lateral movement. A similar pair of links are disposed on the other side of the bolster.

In Fig. 11 is illustrated a means of tying together the two side frame members by means of two parallel transversely extending links 180, each of which is connected to the side frame members adjacent their bottoms by a joint 181 which permits universal movement in all directions to a limited extent. This is accomplished by a loose fitting pivotal connection which permits a limited amount of movement in all directions between the side frames 25 and the links 180 but maintains the two oppositely disposed side frames substantially parallel.

From this description it will be apparent that there is no metal to metal contact between the wheel axles and the load carrying side frames and that any noises or vibrations transmitted therethrough to the side frames must first pass through layers of rubber adapted for the purpose of eliminating such vibration and deadening such noises. In addition, all forces which are transmitted to the side frames from the wheel axles must again pass through the elliptical springs 22 and 23 before they may be transmitted to the truck frame which, in addition, rides upon swing links 17 adapted for movement both longitudinally and transversely of the truck frame thus serving to further eliminate disturbances which might otherwise be transmitted to the car body.

It has been my experience that if the springs 22 and 23 of the trucks 11 and 12 are identical in stiffness and in the load normally supported thereby, or if the loads differ and the stiffness is proportional to the loads, so that their natural period of vibration is the same, there is a probability of a synchronism of movement developing in the two ends of the car, which necessarily constitutes a rigid body connecting the two springing mechanisms, which may built up to uncomfortable or undesirable proportions. As springs of this character may be secured of various degrees of stiffness I have found it desirable to employ in the trucks 11 and 12 springs which bear a slightly different relation to the load supported thereby so that the static deflection thereof will differ at least ten percent, but preferably more, so as to prevent the development of synchronized movement between the two ends of the car which difference produces natural rates of vibration sufficiently different that any movement of one end of the car tends to interfere with and break up any regular movement of the other end of the car, thus preventing synchronism of movement between the two ends of the car which I have found to be undesirable. I have found that a difference in natural period of vibration between the ends of five percent or more will accomplish this object.

Although I have illustrated but one form of my invention and have described in detail but a single application thereof, it will be apparent to those skilled in the art that my invention is not so limited but that various modifications and changes may be effected therein without departing from the spirit of my invention or from the scope of the appended claims.

I claim:

1. In a railway car truck, a pair of laterally spaced longitudinally extending spaced sheet metal side frames having wheel axles rotatably mounted thereon adjacent the ends thereof, each side member comprising a top and a bottom member spaced throughout the major portion of their lengths and secured together adjacent the ends thereof, said top and bottom members each comprising a closed hollow member in cross-section, a centrally arranged vertically disposed longitudinally extending web member interconnecting said top and bottom members and extending lengthwise thereof continuously between said axles, said web member being provided with a centrally disposed opening for the reception of a relatively movable transversely extending supporting member, and a pair of longitudinally extending leaf spring members resting centrally on said lower member, one on each side of said web member, said leaf spring members being adapted to resiliently support said supporting member.

2. In a railway car truck, a truck frame, a straight cylindrical pivot pin rotatably journalled in said truck frame and disposed longitudinally thereof said pin having a transversely extending arcuate notch on one side thereof, and a swing link provided with an opening at one end thereof adapted to fit over said pin and rest in said notch, the portion of said link engaging said notch being arcuate in vertical cross-section and of smaller radius than the radius of the arcuate notch in said pivot pin.

3. In a railway car truck, a pair of laterally spaced parallel side frames having wheel axles mounted thereon adjacent the ends thereof, each side frame comprising longitudinally extending top and bottom portions and a vertically disposed web member interconnecting said top and bottom portions, a pair of leaf springs mounted on said bottom member and disposed one on each side of said web member, and means for clampingly engaging said leaf springs comprising abutments disposed on opposite sides of the two sets of springs, spacing means engaging both sets of springs and passing freely through said web, and a wedging member adapted to engage one of said abutments and one of said springs to force said springs, spacing member and opposite abutment into clamping engagement with each other.

4. In a railway car truck, a pair of laterally spaced side frames having wheel axle journals mounted thereon adjacent the ends thereof, each of said side frames comprising two substantially similar oppositely disposed sheet metal side members each having a centrally arranged cutaway portion and having its free edges turned inwardly towards the oppositely disposed sheet metal side member and so arranged that when said free edges are united by welding various sections throughout its length represent hollow box sections, and a sheet metal web member disposed between said sheet metal members and welded thereto, said web member being arranged to close the opening in said side frame resulting from said cutaway portions in said oppositely disposed sheet metal side members and terminating short of the ends thereof, said sheet metal web member being provided with a centrally arranged opening adapted to receive a truck bolster supporting member.

ROBERT N. JANEWAY.